_Patented Sept. 28, 1954_

2,690,437

UNITED STATES PATENT OFFICE 2,690,437

AZOIC COLORING MATTERS OF FAST BASES OF THE TRIAZINE SERIES

Frederick Brody, New York, N. Y., assignor to American Cyanamid Company, New York, N. Y., a corporation of Maine No Drawing. Original application March 1, 1952, Serial No. 274,488. Divided and this application December 29, 1953, Serial No. 401,039

4 Claims. (Cl. 260—153)

The present invention relates to azoic coloring matters having the following formula:

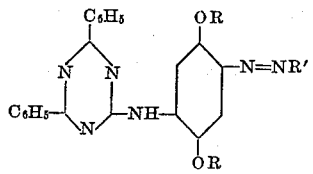

in which R is lower alkyl and R' is a residue of an ice-color coupling component.

In the past it has been a considerable problem to obtain azoic coloring matters which have a greenish blue shade. For the most part, the few coloring matters having the desired shade have been expensive and have had other unsatisfactory characteristics. Among the compounds of the present invention those in which R' is a residue of an arylide of 2-hydroxy-3-naphthoic acid are blue azo coloring matters of a very desirable green shade which have good fastness and other properties. They constitute the preferred embodiment of the present invention, although in a broader aspect the invention is not limited thereto.

Although the intermediate amines used in preparing the diazo components of the colors of the present invention, that is to say, compounds corresponding to the above formula in which —N=NR' is replaced by —NH₂, are themselves new chemical compounds, they are not claimed in the present case, being the subject matter of a parent case, Serial No. 274,488, filed March 1, 1952, of which the present application is a division.

Among the typical ice-color coupling components which may be used in the present invention are compounds such as beta-naphthol; 8-amino-2-naphthol; 8-acetylamino-2-naphthol, benzylnaphthols, pyrazolones, hydroxybenzofluorenones, and the various N-substituted amides such as arylides of 2-hydroxy-3-naphthoic acid, of 2-hydroxy-3-anthroic acid, of methyl and dimethylsalicyclic acids, of hydroxycarbazole carboxylic acids, of hydroxybenzocarbazole carboxylic acids, of hydroxybenzacridone carboxylic acids, of hydroxydibenzofuran carboxylic acids, of hydroxybenzothiophene carboxylic acids, of acetoacetic acid, of benzoylacetic acid, and the like.

This invention is further illustrated by the following examples. Where not otherwise specified, parts are by weight.

Example 1

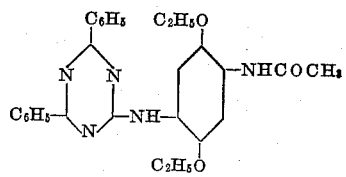

A mixture of 2.16 parts of 2,4-diphenyl-6-chlorotriazine and 1.93 parts of 2,5-diethoxy-4-aminoacetanilide in 50 parts of 50% dioxane-water containing 8.1 parts of 0.1 N hydrochloric acid is refluxed with stirring. The product shortly begins to separate out from solution, and when the reaction is complete, the mixture is cooled and filtered. The product is washed and dried. The yield is excellent.

Example 2

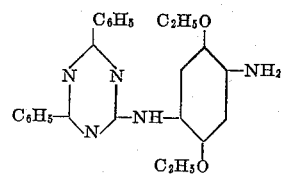

A mixture of 6.02 parts of the above prepared product and 21 parts of concentrated hydrochloric acid in 73 parts of butyl alcohol is refluxed until hydrolysis is complete, cooled, and filtered. The product is obtained in the form of its hydrochloride, which decomposes without melting above 250° C. This reaction can also be run in excellent yield in ethanol instead of butanol.

The hydrochloride is readily converted to the free base by dissolving in warm pyridine and drowning in water.

Example 3

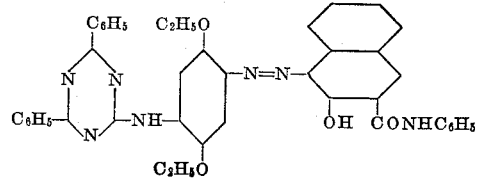

The above prepared base is diazotized in the ordinary way with hydrochloric acid and sodium nitrite and used to develop cotton cloth padded with 2-hydroxy-3-naphthoic anilide. Blue dyeings are obtained of extremely greenish shade, and good fastness properties.

*Example 4*

The procedure of Examples 1 and 2 is followed, replacing the 2,5-diethoxy-4-aminoacetanilide with the corresponding 2,5-dimethoxy-4-aminoacetanilide. The reaction proceeds smoothly and an excellent yield of the base is obtained. It diazotizes readily and when coupled with 2-hydroxynaphthoic acid arylides, yields blue dyestuffs having a slightly different shade from the product of Example 3. The coloring matter produced by using the coupling component of Example 3 has the following formula

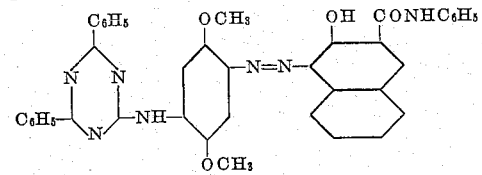

I claim:
1. An azoic coloring having the formula

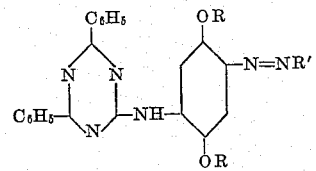

in which R is lower alkyl and R' is the residue of an ice-color coupling component.

2. An azoic coloring matter having the formula

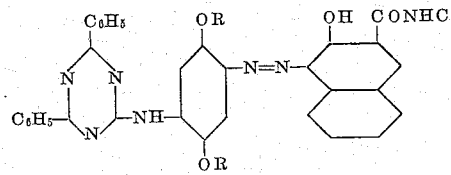

in which R is lower alkyl.

3. An azoic coloring matter having the formula

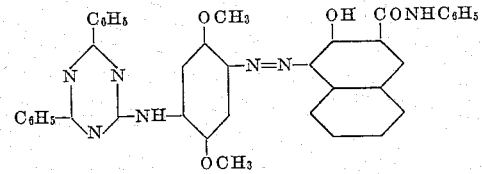

4. An azoic coloring matter having the formula

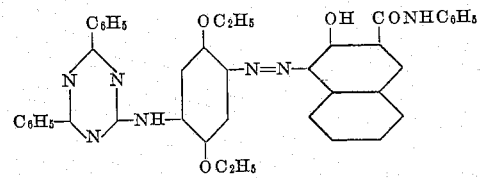

No references cited.